United States Patent
Gabriele et al.

(10) Patent No.: US 11,866,523 B2
(45) Date of Patent: Jan. 9, 2024

(54) WATER-MEDIATED POLYESTER (METH)ACRYLATION SYSTEMS

(71) Applicant: THE SECANT GROUP, LLC, Telford, PA (US)

(72) Inventors: Peter D. Gabriele, Frisco, TX (US); Scott Radzinski, Gilbertsville, PA (US); Jeremy J. Harris, Doylestown, PA (US); Brian Ginn, Harleysville, PA (US)

(73) Assignee: THE SECANT GROUP, LLC, Telford, PA (US)

( * ) Notice: Subject to any disclaimer, the term of this patent is extended or adjusted under 35 U.S.C. 154(b) by 298 days.

(21) Appl. No.: 17/223,722

(22) Filed: Apr. 6, 2021

(65) Prior Publication Data
US 2021/0309766 A1 Oct. 7, 2021

Related U.S. Application Data

(60) Provisional application No. 63/005,654, filed on Apr. 6, 2020.

(51) Int. Cl.
*C08G 63/20* (2006.01)
*C08G 63/78* (2006.01)
(Continued)

(52) U.S. Cl.
CPC ............ *C08F 2/10* (2013.01); *C08F 2/50* (2013.01); *C08F 120/14* (2013.01);
(Continued)

(58) Field of Classification Search
None
See application file for complete search history.

(56) References Cited

U.S. PATENT DOCUMENTS

| 5,296,334 A | 3/1994 | Castaldi et al. |
| 5,529,914 A | 6/1996 | Hubbell et al. |
| (Continued) | | |

FOREIGN PATENT DOCUMENTS

EP 3149067 A1 4/2017

*Primary Examiner* — Richard A Huhn
(74) *Attorney, Agent, or Firm* — McNees Wallace & Nurick LLC (57) ABSTRACT

A water-mediated process prepares a polymeric (meth)acrylation composition. In some embodiments, the process includes providing a stabilized aqueous solution including a (meth)acrylation component and a polyol monomer in a vessel under an inert atmosphere and adding a diacid monomer to the vessel under the inert atmosphere. In some embodiments, the process includes providing a stabilized aqueous solution including a (meth)acrylation component and a copolymer of a polyol monomer and a diacid monomer in a vessel under an inert atmosphere. The process further includes heating and removing water from the vessel under the inert atmosphere to produce the polymeric (meth)acrylation composition. The polymeric (meth)acrylation composition includes a (meth)acrylation polyester copolymer of the diacid monomer and the polyol monomer with the (meth)acrylation component conjugated to the (meth)acrylation polyester copolymer. In some embodiments, the polymeric (meth)acrylation composition is free of mineral acid and free of cytotoxic solvents, catalysts, and scavengers.

15 Claims, 1 Drawing Sheet

(51) Int. Cl.
*C08G 63/91* (2006.01)
*C08F 2/10* (2006.01)
*C08F 2/50* (2006.01)
*C08F 120/14* (2006.01)

(52) U.S. Cl.
CPC .......... *C08F 2438/02* (2013.01); *C08G 63/20* (2013.01); *C08G 63/78* (2013.01); *C08G 63/916* (2013.01)

(56) References Cited

U.S. PATENT DOCUMENTS

| | | |
|---|---|---|
| 8,691,203 B2 | 4/2014 | Bettinger et al. |
| 9,359,472 B2 | 6/2016 | Nicholson et al. |
| 2012/0269761 A1 | 10/2012 | Bettinger et al. |
| 2015/0344618 A1 | 12/2015 | Nicholson et al. |
| 2019/0016854 A1 | 1/2019 | Gabriele et al. |

…

WATER-MEDIATED POLYESTER (METH)ACRYLATION SYSTEMS

CROSS-REFERENCE TO RELATED APPLICATIONS

This application claims priority to and the benefit of U.S. Provisional Application No. 63/005,654 filed Apr. 6, 2020, which is hereby incorporated by reference in its entirety.

FIELD OF THE INVENTION

The present disclosure is generally directed to (meth)acrylation of oligomers and polymers of polyols and diacids. More specifically, the present disclosure is directed to water-mediated formation of (meth)acrylation systems of oligomers and polymers of glycerol and sebacic acid.

BACKGROUND OF THE INVENTION

Poly(glycerol sebacate) is a crosslinkable elastomer formed as a co-polymer from glycerol and sebacic acid. Poly(glycerol sebacate) is biocompatible and biodegradable, reduces inflammation, improves healing, and has antimicrobial properties, all of which make it useful as a biomaterial in the biomedical field.

In conventional functional polymer acrylation processes, the pre-polymer is prepared with an acid chloride acrylate. Such processes result in the production of hydrogen chloride (HCl) as a by-product of the acid chloride reaction. In biodegradable and medical device compositions, HCl is considered hazardous as well as cytotoxic. Furthermore, the presence of a mineral acid such as HCl renders the final polycondensation polymer susceptible to acid hydrolysis. Consequently, a limitation of this conventional acid chloride approach is that a cleaning step is required to rid the polymer of residual mineral acid. The cleaning step is typically an aqueous based and as PGS is a polyester that is susceptible to hydrolysis, an aqueous cleaning step is not recommended due to potential premature degradation of the polymer. This cleaning step is not always efficient enough to reduce the amount of residual mineral acid to a sufficiently-low level.

U.S. Pat. No. 8,691,203, entitled "Method comprising contacting tissue with a crosslinkable polyester prepolymer" and issued Apr. 8, 2014 to Bettinger et al., incorporated by reference herein in its entirety, discloses a process of forming acrylates of poly(glycerol sebacate). The process of Bettinger includes toxic materials as solvents, catalysts, and scavengers that are not appropriate for biological systems. These toxic materials include triethylamine (TEA), 4-dimethylaminopyridine (DMAP), and dichloromethane (DCM). To remove these materials after formation of the acrylate, Bettinger discloses crashing out the TEA salt and then evaporating the solvent, which is unlikely to remove all of the TEA. Also, there is no mention by Bettinger on how to remove the DMAP, so that a significant amount of this component is likely still present in the poly(glycerol sebacate acrylate) (PGSA) product.

In conventional ultraviolet (UV)-cured other radiation-cured systems, the photoinitiator (PI) is generally considered to be cytotoxic. The initiation process is inefficient such that, after exposure, up to 90% of the PI may still be present in the film in the uninitiated form, migrate out of the matrix, and further initiate by heat, light, or mechanical action, rendering toxic by-products. During conventional radiation crosslinking processes, the acrylic vinyl group is often caged in the polymer mass as an unreacted vinyl group, because as the film crosslinks, it shrinks, excluding a free PI out of initiating proximity.

In conventional systems, the PI is added after formation of the polymer. Post-addition of PI is often inefficient because of limited dispersion or migration of additives in the acrylated film, causing localized pockets of initiation rather than uniform polymerization.

Another issue with post-added PI is that the absorbing species should be well-dispersed in the full thickness of a film in order for the initiating frequency to penetrate to the bottom of the film. The PI is first an energy absorber that then transitions to the initiator. The absorption of initiating energy interacts with the absorbing PI species according to Beer's law. If the concentration of the PI is too dense or poorly dispersed above the base of the film, the PI acts as a radiation absorber to block radiation penetration to the full thickness.

There is a need for a polymer (meth)acrylation system that is non-cytotoxic, free of mineral acid, and free of cytotoxic solvents, catalysts, and scavengers and having predominantly or only metabolizable degradation by-products.

BRIEF DESCRIPTION OF THE INVENTION

In exemplary embodiments, a water-mediated process prepares a polymeric (meth)acrylation composition. The process includes providing a stabilized aqueous solution including at least one (meth)acrylation component and a polyol monomer in a vessel under an inert atmosphere. The process also includes adding a diacid monomer to the vessel under the inert atmosphere. The process further includes heating and removing water from the vessel under the inert atmosphere to produce the polymeric (meth)acrylation composition. The polymeric (meth)acrylation composition includes a (meth)acrylation polyester copolymer of the diacid monomer and the polyol monomer with the at least one (meth)acrylation component conjugated to the (meth)acrylation polyester copolymer.

In exemplary embodiments, a polymeric (meth)acrylation composition includes a polyester of a polyol monomer and a diacid monomer and at least one (meth)acrylation component conjugated to the polyester by an ester bond. The polymeric (meth)acrylation composition is free of mineral acid and free of cytotoxic solvents, catalysts, and scavengers.

In exemplary embodiments, a water-mediated process of preparing a polymeric (meth)acrylation composition includes providing a stabilized aqueous solution including at least one (meth)acrylation component and a copolymer of a polyol monomer and a diacid monomer in a vessel under an inert atmosphere. The process also includes heating and removing water from the vessel under the inert atmosphere to produce the polymeric (meth)acrylation composition. The polymeric (meth)acrylation composition includes a (meth)acrylation polyester copolymer of the diacid monomer and the polyol monomer with the at least one (meth)acrylation component conjugated to the (meth)acrylation polyester copolymer.

Various features and advantages of the present invention will be apparent from the following more detailed description, which illustrates, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Figure 1:
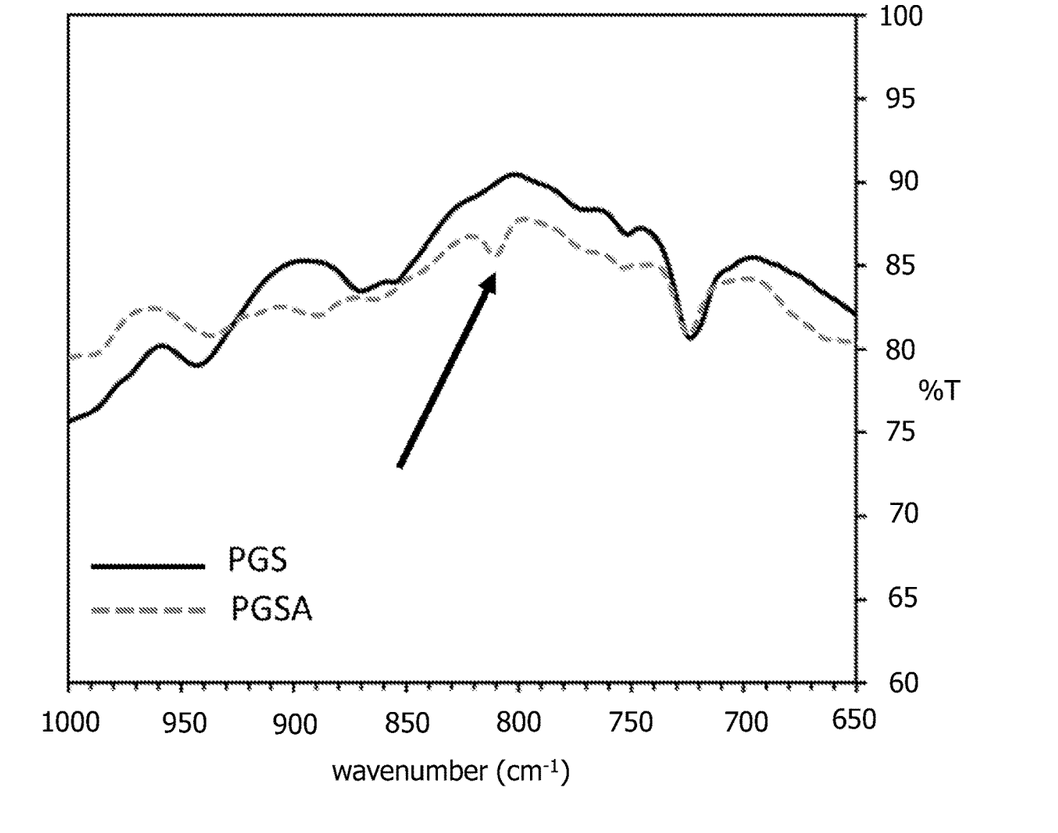
The FIGURE shows Fourier-transform infrared (FT-IR) spectra of PGS and PGSA.

Provided are compositions and processes of formation of a non-cytotoxic polyester (meth)acrylate and/or a non-cytotoxic radiation-curable composition as a clear biocompatible nutrient-complex polymer.

Embodiments of the present disclosure, for example, in comparison to concepts failing to include one or more of the features disclosed herein, provide an entire charge of raw materials stabilized with only natural, non-toxic stabilizers; provide a natural photoinitiator for initiating a radiation cure; provide a biocompatible radiation-curable polymeric system; provide a (meth)acrylate that is free of mineral acid toxic by-products; eliminate a clean-up step; ensure (meth)acrylate polymer stability; provide a reactive vinyl functional group substantially uniformly distributed throughout a polymer mass; provide the incorporation of growth media-type components, such as, for example, interleukins, growth factors, or natural nutrient species as known metabolites, without heat that may be detrimental to biologics, to promote and propagate radiation-initiated (meth)acrylic and vinyl free-radical crosslinking or to be metabolized without consequence to cellular health; or combinations thereof.

As used herein, "(meth)acrylate" refers to acrylate and/or methacrylate, and "(meth)acrylation" refers to an addition reaction with acrylic acid (acrylation) and/or an addition reaction with methacrylic acid (methacrylation).

Biodegradable elastomers, such as, for example, polymers of (glycerol sebacate) (PGS), are important metabolite-based scaffold materials used in three-dimensional (3-D) tissue-engineered constructs. Dual-cure (radiation/thermal) systems provide benefit to form-factored engineering. For instance, an engineered form made from neat PGS prepolymer resin is susceptible to temperatures slightly above human body temperature, making it difficult and sometimes impossible for precise (repeatable) 3-D PGS constructs and structures to hold a 3-D tack-free-design form during thermal processing via polycondensation of the PGS. Additionally, vertical and conformal coatings treatments subject to gravity can be instantly hardened with a radiation-responsive PGSA. Such pre-polymer temperature limitations render feature-driven articles, such as, for example, films, coatings, extrudates, and moldings, featureless.

A metabolite-based biodegradable scaffold, such as PGS, supports cell metabolism and energy supply to the expanding culture. Anatomical features are often conserved structures that support mechano-biologic action of the expanding cellular transformation into a tissue. A radiation-curable PGS such as PGSA synthesized with non-cytotoxic additives creates not just a non-cytotoxic system, but also a cell-friendly functional surface in contact with the cells.

In exemplary embodiments, a highly-elastic UV-curable polymeric (meth)acrylation composition is able to instantly harden or cure a complex engineering form to hold its intended shape when the polymeric (meth)acrylation form is thermally converted via polycondensation. During the thermal ramp-up to crosslinking temperature ranges, the radiation pre-hardened structure establishes a solid form that is maintained during the cure cycle.

A notable feature of this radiation-curable process is the maintenance of elastomeric properties. However, in situ, it is the interplay between the metabolic building blocks and non-cytotoxic degradation by-products, the elastomeric nature (degrees of freedom) of the polymer, and its precise 3-D form under mechano-biologic stressors that provides a significant advantage over prior systems.

For instance, a polymeric (meth)acrylation resin may support the formation of a UV-cured fiber; a UV-curable cladding; a photo-mask; an additive manufacturing bio-ink; a conformal coating; a functional article, such as, for example, an expandable balloon for stenting and vascular technologies; a film, an adhesive, or a coating for a bioreactor construct; a biosensor platform or microcircuit; a microcarrier; or an active functionalized surface modification.

In exemplary embodiments, a water-mediated process forms a radiation-curable (meth)acrylate polyester prepolymer from a polyol monomer and a diacid monomer that is crosslinkable by free radical, controlled radical, cationic, anionic, or coordination polymerization. The incorporation of (meth)acrylic vinyl groups into a prepolymer leads to a free radical crosslinked polyester polymer through the vinyl group propagation, once initiated.

In exemplary embodiments, a polymeric (meth)acrylation composition includes one or more saccharides. Appropriate saccharides may include, but are not limited to, D-glucose, D-galactose, D-glucosamine, D-fructose, or D-xylose. The incorporation of a saccharide may take advantage of biological carbohydrate metabolism pathways. Incorporation of a saccharide having an amine group, such as D-glucosamine, provides an attachment site for other functional groups or crosslinking schemes.

In some embodiments, the polyol monomer is a diol monomer. In some embodiments, the polyol monomer is a triol monomer. In some embodiments, the polyol monomer is glycerol.

In some embodiments, the diacid monomer includes a compound of the formula $[HOOC(CH_2)_nCOOH]$, where $n=1-30$. In some embodiments, the diacid monomer includes malonic acid, succinic acid, glutaric acid, adipic acid, pimelic acid, suberic acid, azelaic acid, sebacic acid, or a combination thereof. In some embodiments, the diacid monomer is sebacic acid.

In exemplary embodiments, the polyol monomer is glycerol and the diacid monomer is sebacic acid such that the prepolymer is an oligomer of (glycerol sebacate) (OGS).

As used herein, PGS refers to a polymer of (glycerol sebacate) having a weight average molecular weight of greater than 10,000, and OGS refers to an oligomer of (glycerol sebacate) having a weight average molecular weight of 10,000 or less.

As used herein, (meth)acrylation component refers to a (meth)acrylate, a photoinitiator, a co-initiator, or any combination thereof. The (meth)acrylation component preferably includes a hydroxy group or a carboxyl group for conjugation to the polyester through an ester bond.

As used herein, vessel may refer to a beaker, bottle, canister, flask, bag, receptacle, tank, vat, jar, vial, tube, or the like that are generally known in the art to contain fluids or fluid-like materials and liquids.

In exemplary embodiments, the process prepares a system to (meth)acrylate a polycondensation reaction without propagating or initiating a free radical polymerization of the (meth)acrylate during the polycondensation reaction. The process preserves the radiation cure capability of the (meth)acrylate while processing the bulk under polycondensation conditions.

In exemplary embodiments, the water-mediated process first includes stabilization of the aqueous preparation. The presence of oxygen or peroxide in the water-mediated system may lead to premature initiation of the (meth)acrylate polymerization. Oxygen in the ground state is a bi-radical and is therefore a potential threat to free radical initiation. Water is known to contain dissolved oxygen. In exemplary embodiments, the water-mediated process controls free radical run-away reactions during the (meth)acrylation step.

This stabilization preferably includes water degassing to remove, for example, dissolved oxygen, a process that may be accomplished in any of a number of appropriate ways, including, but not limited to, vacuum heating, filtration, sonication, purging with an inert gas, freeze pump thaw cycles, or chemical washing. In exemplary embodiments, the degassing is followed by addition of one or more water-soluble free radical stabilizers or polymerization inhibitors, such as, for example, hydroquinone (HQ) or monomethyl ether hydroquinone (MEHQ). In similar fashion, the other organic starting materials may be prepared with radical inhibitors, including HQ and MEHQ, as well as hindered stabilizers.

In some embodiments, the (meth)acrylation component is a (meth)acrylate. In some embodiments, the (meth)acrylate is acrylate. In some embodiments, the (meth)acrylate is methacrylate.

In some embodiments, all materials are combined into a single charge, where the process includes preparing a stabilized aqueous source to eliminate premature oxygen initiation by degassing and addition of free radical inhibitors. All raw material components are processed for degassing and radical inhibition and may be charged into a vessel with an inert atmosphere. The random polycondensation reaction may then occur in a process profile similar to a water-mediated process without the (meth)acrylate.

In some embodiments, the glycerol monomer is pre-(meth)acrylated prior to co-polymerization with sebacic acid. The glycerol is partially ester-(meth)acrylated such that a predetermined degree of free hydroxy groups remains to react with sebacic acid for the polycondensation. The new glycerol (meth)acrylate raw material may be processed into a standard working PGS charge or may be combined with glycerol and sebacic acid as a tertiary blend of raw materials.

In some embodiments, a low molecular weight OGS is formed and then (meth)acrylated. Once the starting components get to an early phase oligomeric state in the water-mediated system, the added (meth)acrylic acid then populates residual and available hydroxy groups.

In some embodiments, the addition of some measure of polymer antioxidant additive quenches the possibility of free radical run-away reactions. Appropriate polymer antioxidant additives may include, but are not limited to, a hindered phenolic, a hindered amine, or a peroxide decomposer. In some embodiments, free radical stabilizers of natural origin, including, but not limited to, vitamin E, citric acid, or vitamin A, are incorporated.

In some embodiments, the (meth)acrylation component is a photoinitiator (PI), a co-initiator (CI), or a combination thereof. Such (meth)acrylation components may include any natural photo-responsive molecules, including, but not limited to, vitamins, minerals, organic pigments, amino acids, or peptide sequences that can generate free radicals, abstract hydrogen radicals, or act as an energy transfer agent (ETA) to promote useful photoprocesses or a photosensitizer to drive a propagating free radical or cationic photocrosslinking action. Such materials may include natural photoinitiating dyes or colorants having appropriately functional structures that can respond with initiation in the range from UV through visible and including infrared photoinitiation. In some embodiments, radio frequency waves, microwaves, and/or gamma rays may also act to drive the initiation through additional energy initiation modes.

In exemplary embodiments, the PI is a natural PI. In exemplary embodiments, the natural PI is a B vitamin or other plant-derived photosensitive radical-producing moiety. The anchoring and proximity of PI to the free radical-responsive system leaves minimal cytotoxic residuals. The unused or uninitiated PI either remains in the polymer matrix or may be metabolized.

Appropriate PIs may include, but are not limited to, molecules capable of capturing light energy and initiating the polymerization of an oligomer or macromer. Exemplary dyes absorb light having a frequency between 250 nm and 900 nm or more preferably between 365 nm and 700 nm, can form free radicals or transfer radiant energy to a CI, are at least partially water-soluble, and are non-cytotoxic at the concentration used for polymerization. Appropriate dyes as PIs may include, but are not limited to, ethyl eosin, eosin Y, fluorescein, 2,2-dimethoxy-2-phenylacetophenone, 2-methoxy-2-phenylacetophenone, camphorquinone, rose bengal, methylene blue, erythrosin, phloxime, thionine, riboflavin, and methylene green. In exemplary embodiments, the PI is riboflavin. Riboflavin's spectral properties in aqueous solution are particularly favorable to the water-mediated (meth)acrylation process.

In some embodiments, the PI is an ionic mineral species with nutritional value and with strong dipole moments to respond to the radiofrequency/microwave energy spectrum to generate radicals.

In exemplary embodiments, the CI is a nitrogen-based compound capable of stimulating the free radical reaction or hydrogen abstraction. The CI may be a primary, secondary, tertiary, or quaternary amines, or any nitrogen-containing electron-rich molecules. Appropriate CIs may include, but are not limited to, triethanolamine, triethylamine, ethanolamine, N-methyl diethanolamine, N,N-dimethyl benzylamine, N-benzyl ethanolamine, N-isopropyl benzylamine, tetramethyl ethylenediamine, potassium persulfate, tetramethyl ethylenediamine, lysine, ornithine, histidine, and arginine. In exemplary embodiments, the CI is an amino acid, preferably lysine, histidine, or arginine. Such amino acid components support cellular nutrition and metabolic function.

U.S. Pat. No. 9,359,472, entitled "Water-mediated preparations of polymeric materials" and issued Jun. 7, 2016 to Nicholson et al., incorporated by reference herein in its entirety, discloses a water-mediated polymerization process to form oligomers and polymers of a polyol monomer and a diacid monomer. Certain aspects of the present process can be adapted from the PGS water mediation process described in U.S. Pat. No. 9,359,472.

In exemplary embodiments, the process includes one or more stabilizing steps.

In exemplary embodiments, the process includes a (meth)acrylation component that is miscible in water. This water miscibility allows the (meth)acrylation component to be incorporated into the reactor charge.

The step of combining the polyol monomer, the (meth)acrylation component, and the aqueous solution may take place at room temperature in the vessel or may include heating of the polyol monomer, the (meth)acrylation component, and the aqueous solution to a temperature in the range of about 50° C. to about 200° C. In certain embodiments, the step of combining the polyol monomer, the (meth)acrylation component, and the aqueous solution may include heating the polyol monomer, the (meth)acrylation component, and the aqueous solution to a temperature in the range of about 80° C. to about 150° C. or, preferably, about 90° C. to about 110° C. Additionally, the polyol monomer, the (meth)acrylation component, and the aqueous solution after combination may be heated for about 5 minutes to about 240 minutes, or about 30 minutes to about 180 minutes, or for a time sufficient to dissolve or homogenously disperse the polyol monomer and the (meth)acrylation component in the aqueous solution. In formulations or compositions contemplated for non-medical use, a tin octoate catalyst may be used to drive the reaction at a lower temperature.

After the polyol monomer, the (meth)acrylation component, and the aqueous solution are combined in the vessel, a diacid monomer may be added to the vessel and mixed with the polyol monomer, the (meth)acrylation component, and the aqueous solution. The diacid monomer may be added neatly (i.e., without being dispersed or dissolved in solvent) to the vessel or may be added as a solution or mixture in a selected solvent. Such diacid monomers may have the formula [HOOC(CH$_2$)$_n$COOH], where n=1-30. The diacid monomer may include malonic acid, succinic acid, glutaric acid, adipic acid, pimelic acid, suberic acid, azelaic acid, or sebacic acid. The diacid monomer may be sebacic acid. In some embodiments, monoacid small chain fatty acids may be considered as acid monomers. In certain aspects, the polyol monomer, the diacid monomer, and the aqueous solution (e.g., water) may be provided in a molar ratio of about 0.5 mol to about 5 mol polyol monomer:about 0.5 mol to about 5 mol diacid monomer:about 0.5 mol to about 5 mol water, with the polyol monomer and diacid monomer preferably present to achieve a molar equivalent of polyol and diacid monomers. In a particular aspect, sebacic acid, glycerol, and water may be combined in molar ratio of about 1 mol to about 2 mol sebacic acid, about 1 mol to about 2 mol glycerol, and about 2 mol to about 5 mol water.

Following addition of the diacid monomer to the vessel, the contents of the vessel (e.g., polyol monomer, (meth)acrylation component, aqueous solution, and diacid monomer) may then be refluxed by heating the vessel. Refluxing the contents of the vessel provides, for example, melting of the diacid monomer where the diacid monomer is a solid at room temperature. Indeed, an exemplary process may begin by adding water to the reaction mixture, thereby reducing the mixture's overall viscosity. This allows the mixture to be stirred easily. The water provides efficient heat transfer between reaction vessel walls and solid diacid monomer (e.g., sebacic acid), allowing the diacid monomer to melt quickly and form a dispersion. For example, sebacic acid is slightly soluble in water at room temperature, and this solubility is increased as the temperature increases. The suspension or colloidal mixture interaction further facilitates efficient liquefaction of the solid diacid monomer. Moreover, the presence of the water in the mixture impedes the reaction of, for example, glycerol and sebacic acid, thus allowing all reactants to be molten and homogenous before the water is removed and the reaction substantially commences.

The step of refluxing the contents of the vessel may also include providing a condenser to the vessel in order to preserve the volume of solvent (e.g., water) contained within the vessel. Refluxing the contents of the vessel may include heating the contents to a temperature in the range of about 50° C. to about 200° C. or about 80° C. to about 150° C. Preferably, the contents of the vessel are heated to a temperature in the range of about 100° C. to about 140° C. Additionally, the polyol monomer, (meth)acrylation component, aqueous solution, and diacid monomer may be heated for a selected period of time, which may include a period in the range of about 1 hour to about 336 hours or, more particularly, about 24 hours to about 48 hours. Alternatively, where the diacid monomer is a liquid or oil at room temperature, the step of refluxing may be avoided. It will further be appreciated that in some embodiments, the vessel may be pressurized to reach temperatures up to 200° C. or higher to shorten the time under reflux and/or for use in melting diacids that remain solid at high temperatures that could not otherwise be readily achieved.

After refluxing the contents of the vessel to achieve melting and thorough mixing of the reactants, the water added to the vessel to render that achievement is removed, such as through distillation or any other process known in the art. The remaining reactants exist in liquid form, and are homogenously mixed, thus allowing the reaction to proceed in a controlled manner, which includes the production of additional water as a reaction by-product. That is, some of the water present in the vessel and subsequently removed is a result of its inclusion in the aqueous solution, while some is present as the byproduct of the condensation reaction. By measuring the amount of water removed, it can be determined when the included water has all been removed, which gives a general idea of when the reaction shifts back toward the production of product, meaning that all reactants come to the reaction at the same time.

The step of distilling the water from the vessel may include heating the vessel to a temperature in the range of about 50° C. to about 200° C. or, particularly, about 80° C. to about 150° C. In a particular aspect, the step of distilling the water from the vessel may include heating the vessel to a temperature in the range of about 110° C. to about 140° C., such as about 115° C., about 120° C., about 125° C., or about 130° C., or any temperature or range of temperatures therebetween, although vacuum distillation at lower temperatures is also contemplated.

Following the distillation of the added water from the vessel, the polyol monomers, the (meth)acrylation component, and the diacid monomers can readily react and polymerize, forming the polymeric material. Thus, the polymeric material is thereby produced directly from the vessel to yield the final product. Typically, producing the polymer material includes two separate steps after the added water is removed involving first heating under an inert gas followed by heating under application of vacuum, in which water of reaction is distilled from the vessel. Heating the contents of the vessel in these two steps (inert gas purge and vacuum) may be at the same or different temperatures from one another. The temperature may range from about 50° C. to about 200° C. or, particularly, about 80° C. to about 150° C. In a particular aspect, the contents of the vessel may be heated to a temperature in the range of about 100° C. to about 140° C., such as about 115° C. to about 135° C., such as about 115° C., about 120° C., about 125° C., about 130° C., or about 135° C., or any temperature or range of temperatures therebetween.

The distillation may occur in conjunction with stirring and/or purging the contents of the vessel by reaction under an inert gas, such as following an initial distillation step after reflux to remove the water added as a processing aide. As used herein, the term "inert gas" may refer to nitrogen, carbon dioxide, a noble gas, or a combination thereof. For example, noble gases may include helium, neon, argon, and the like. In certain aspects, the inert gas is nitrogen. The process may include purging the contents of the vessel with an inert gas at a rate in the range of about 1 mL/min to about 10 L/min, such as while heating in the range of temperatures previously described. Moreover, inert gas purging of the vessel may be provided for a period of about 1 minute to about 48 hours or, more particularly, for about 1 hour to about 24 hours and preferably is conducted at atmospheric pressure, although carrying out this step at higher or lower pressures is also contemplated. In some embodiments, the inert gas purge occurs throughout the process.

Distillation may include heating and/or applying sub-atmospheric pressure to the vessel, and in particular distillation to remove water of reaction following the inert gas purge step of producing takes place through the application of a vacuum. For instance, distilling may include connecting a source of sub-atmospheric pressure to the vessel according to any process known in the art (e.g., a fluidic connection of a peristaltic pump, diaphragm pump, rotary pump, etc.). Sub-atmospheric pressure may be applied to the vessel at a pressure of less than about 760 Torr or, particularly, at a pressure in the range of about 40 mTorr to about 50 Torr. In another aspect, sub-atmospheric pressure may be applied to the vessel at a pressure in the range of about 5 Torr to about 20 Torr, such as about 10 Torr.

Additionally, the sub-atmospheric pressure may be applied to the vessel at a constant pressure for a selected period of time or the sub-atmospheric pressure may be varied during the course of its application. For example, the application of sub-atmospheric pressure may include a stepwise reduction from a first pressure to a second pressure, such as a first pressure less than about 760 Torr and the second pressure greater than about 40 mTorr, particularly, greater than about 1 Torr.

The distillation of water from the vessel may include heating and/or applying sub-atmospheric pressure to the vessel for a selected period of time. For example, the heating and/or application of sub-atmospheric pressure to the vessel may be applied for about 1 hour to about 336 hours or, more particularly, about 12 hours to about 168 hours. In a particular aspect, the heating and/or application of sub-atmospheric pressure to the vessel may be applied such as about 24 hours, about 25 hours, about 26 hours, about 27 hours, up to about 48 hours, or any time or range of times therebetween.

In another aspect, the reactants (e.g., the polyol monomers, the (meth)acrylation component, and diacid monomers) may be allowed to react under the application of sub-atmospheric pressure in addition to, or instead of, heating the reactants. Indeed, sub-atmospheric pressure may be applied to the vessel at a pressure of less than about 760 Torr or, particularly, at a pressure in the range of about 40 mTorr to about 50 Torr. In another aspect, sub-atmospheric pressure may be applied to the vessel at a pressure in the range of about 1 Torr to about 50 Torr, such as about 5 Torr to about 20 Torr, such as about 10 Torr. The polymerization of the polyol monomers, the (meth)acrylation component, and the diacid monomers may continue (with or without heating and/or applying sub-atmospheric pressure) for about 1 hour to 336 hours or, particularly, about 12 hours to 168 hours. In a particular aspect, the polymerization (i.e., production of the polymeric material) may continue for about 24 to 120 hours, including about 24 hours, about 25 hours, about 26 hours, about 27 hours, up to about 48 hours, up to about 76 hours, or any time or range of times therebetween.

Upon completion of the polymerization reaction to produce the polymeric material, the resulting polymeric material, which may be in the form of a moldable, pliable resin, is removed from the vessel and stored as desired or required.

In other embodiments, a water-mediated process forms a polymeric (meth)acrylation composition from a stabilized aqueous solution including at least one (meth)acrylation component and a copolymer of a polyol monomer and a diacid monomer in a vessel under an inert atmosphere. Heating and removing water from the vessel produces the polymeric (meth)acrylation composition.

The produced polymeric material contains (meth)acrylate, PI, and/or CI. An advantage of the variability in formulating is that the water-mediated process allows for the design of the base oligomer/macromer with the additional water-miscible species in combination or as individual tethers to the oligomer/macromer. In exemplary embodiments, a polymeric (meth)acrylation system includes (meth)acrylate, PI, and CI. In some embodiments, the polymeric (meth)acrylation system is formed by blending two or more polymeric materials that, in combination but not individually, include (meth)acrylate, PI, and CI. A polymeric material not containing (meth)acrylate, PI, or CI may be included in a blend to form a polymeric (meth)acrylation system.

This non-cytotoxic, metabolizable photo-elastomer system includes the option for a tailored modulus. For instance, the modulus may be designed based on the degree of (meth)acrylation in the presence of enough PI to fully initiate the (meth)acrylic residues. Being able to blend various species allows for such variability.

The water-mediated process provides uniform dispersion of monomer starting materials as well as management of the initiation of the polycondensation that ensures all starting materials are in a single aqueous phase before condensation commences. In other words, the process maximizes uniform dispersion prior to polymerization and promotes efficient functional group proximity.

The water-mediated process allows for uniform dispersion and blending proximity and compatibility of the PI as well to accommodate film thickness limitations. For example, in UV-cured systems, oxygen is a free radical quencher. This is a known problem for thin films cured in air. In conventional systems, the PI is added at a higher concentration to overcome oxygen radical quenching at the air-film surface. This impacts the Beer's law problem and makes through-cure difficult. API that is fixed in location from the water-mediated process, however, is not subject to film migration or gradient disturbance as a result of the application.

In exemplary embodiments, the (meth)acrylated prepolymer does not need to be washed of a mineral acid, has a uniform distribution of (meth)acrylic vinyl groups on the prepolymer, and may be further rendered as a stable product void of mineral acid reverse or hydrolysis during processing, thereby economically and beneficially eliminating a handling step. The utilization of water as a solvent rather than an organic solvent further improves safety and avoids the process shock of the acid chloride to the prepolymer.

The resulting raw material may be used as-is (reactor-ready) or may be incorporated into other compositions of matter.

In exemplary embodiments, the resulting compositions form instant tack-free surface coatings and adhesives.

The resulting radiation-curable composition may be used in any of a number of appropriate applications. In some embodiments, the radiation-curable composition serves as a vehicle, such as, for example, in medical device applications including coatings, binders, 3-dimensional (3-D) printing, 3-D additive technology for scaffold engineering such as where the structure must be cured for immediate handling, shape-directed scaffolding, adhesives, remedial printing inks, paper coatings, dental regeneration, a vehicle carrier for textile and prosthetic implantables, surface coatings for bioreactors with breakdown by-products of the film structure being metabolizable without harm to the expanding cells such as single-use or plastic surface cassettes, self-cleaning erodible coatings for bioreactor rigid plastic components, microcarrier development for cell-based therapeutic processes and handling, such as where rapid sphericalization is desirable, tissue attachment, film manufacturing, active pharmaceutical ingredient (API) delivery, nutrients for cell care, bioreactor sidewall modification, or bio-based remedial material engineering, such as, for example, biodegradable photoresists and circuit boards including high density interconnect (HDI) technology.

A poly(glycerol sebacate acrylate) (PGSA) resin offers a dual functional radiation-thermally convertible coating with a radiation curing step followed by a thermal curing step. PGS resin includes free hydroxy groups and free carboxyl groups that can extend polycondensation upon extended exposure to thermal crosslink temperatures. The PGSA may or may not be diluted with solvent.

U.S. Pat. No. 5,296,334, entitled "Radiation-curable composition useful for preparation of solder masks" and issued to Castaldi et al. on Mar. 22, 1994, which is incorporated by reference in its entirety, discloses a process to form a photosensitive composition including an esterified styrene-maleic anhydride copolymer with esterified (meth)acrylate and esterified alcohol. The composition may be coated onto a surface, masked, and selectively exposed to radiation to form a predetermined cure pattern.

In some embodiments, a PGSA photoresist is formed by the following process. The addition of vinyl (meth)acrylic functionality to PGS to form PGSA creates a dual curing coating whereby a first process may include a radiation exposure convertible step followed by a thermally curable final step. By itself, this dual curing mechanism may be useful in conformal coating applications where a rapid wet-film set-up may be followed by a final thermal polycondensation to maintain a uniform processed film thickness. If the PGSA is considered for a photoresist, the presence of unreacted carboxyl groups following radiation exposure through a mask artwork ("negative") may be selectively cleared or washed out ("developed") in a subsequent step with alkaline developer, preferably sodium hydroxide or potassium hydroxide, thereby creating a selective image. The alkaline mineral base swells and clears the un-radiation-cured PGSA.

In some embodiments, a photosensitive (i.e., radiation-curable) PGSA resin composition is provided for producing a radiation-curable coating in the environment of selected fabrication or imaging. The radiation-curable-thermal-curable dual composition includes a PGS polymer, in which a high percentage of the available sebacate diacid groups thereof are esterified with a hydroxyalkyl (meth)acrylate and/or a polyhydric alcohol such as glycerol, such that the esterified copolymer contains an adequate portion of free carboxyl groups to be neutralized by the alkaline developer. Typically, the composition also includes a photoinitiator, as well as a variety of other additive materials known for use in photosensitive resin compositions for production of resists and masks, such as, for example, pigments and dyes, sensitizers, flow promoting agents, and the like. Yet further, the composition may include an inert liquid carrier or diluent, as may be needed to enable coating it as a uniform layer.

In some embodiments, the process includes coating the foregoing composition onto a substrate, where it is desired to create selected features. The so-applied coating may then be dried or leveled in a pre-cure step, and then be image-wise exposed through an artwork or negative to actinic radiation in the desired pattern to effect image-wise curing and crosslinking of the composition. Unexposed PGSA carboxyl groups in the composition are then removed in a suitable alkaline developer, and the remaining distribution of cured composition is then further treated by, at the least, for example, baking at an elevated temperature to effect further polycondensation curing of free hydroxy groups with free carboxyl groups of the composition to a degree sufficient for it to serve as an application.

Exposure of the coated composition to actinic radiation of suitable energy results in a chemical reaction between vinyl (meth)acrylate groups on the PGSA copolymer or additional (meth)acrylate monomer to effect crosslinking to a degree sufficient to render the exposed, crosslinked composition areas differentially less soluble in developer than the unexposed, uncrosslinked composition areas. After development, it may generally be desirable to effect yet further radiation-induced curing of the patterned composition, in other words, yet further radiation-induced crosslinking between the above-noted (meth)acrylate groups, by additional exposure of the now-patterned composition to actinic radiation.

Additionally, a post-cure step may be employed at conditions effective to bring about yet further curing of the composition, primarily by virtue of thermally-induced crosslinking involving the hydroxy and carboxyl groups.

The PGSA may be further (meth)acrylate-modified for application features. Another component of the composition may be the reactive multifunctional (meth)acrylate monomer, i.e., a monomer containing two or more reactive (meth)acrylate groups, capable of undergoing radiation-induced reaction (typically in the presence of a photoinitiator) with the (meth)acrylate groups on the copolymer to effect crosslinking. The reactive multifunctional (meth)acrylate monomer may include, alone or in mixture, any of the well-known such compounds, including polyol poly(meth)acrylates, such as, for example, 1,6-hexane diol diacrylate, neopentyl glycol diacrylate, trimethylol propane triacrylate, 1,3-butylene glycol diacrylate, tetraethylene glycol diacrylate, and acrylate esters of bisphenol-A based epoxies. The choice of any particular such compound or mixtures thereof may largely be dictated by reactivity for the (meth)acrylate groups on the esterified styrene maleic anhydride copolymer, the desired viscosity properties, and the like.

In exemplary embodiments, a PGSA composition further includes a photoinitiator for initiating the radiation-induced crosslinking of (meth)acrylate groups of the esterified copolymer and the multifunctional (meth)acrylate monomer. For this purpose, any radiation-responsive free-radical generating compound may be employed, such as, for example, the UV-responsive photoinitiators 2,2-dimethoxy-2-phenyl-acetophenone, 2-hydroxy-2-methyl-1-phenyl propanone, benzoin, benzoin methyl ether, benzil, benzophenone, acetophenone, 2-methyl-1-[4-(methyl thio) phenyl]-2-morpholino-propanone-1, isopropyl thioxanthone, and the like. In some embodiments, this further crosslinking forms a PGSA network. In some embodiments, the further crosslinking includes mixing PGSA with a photoinitiator and initiating a crosslinking reaction by exposing the mixture to an appropriate radiation source.

In addition to the foregoing components, a PGSA composition may contain a wide variety of functional additives, such as, for example, the earlier-mentioned agents for thermal crosslinking with epoxide groups of the multifunctional epoxide, flow promoting agents, visible radiation absorbing agents, carboxyl functional acrylic copolymers, air release agents, pigments and dyes, sensitizers, viscosity control agents or modifiers, filler/extender pigments, monofunctional radiation-curable monomers, cationic initiating monomers, and the like.

Additional applications for the polymeric (meth)acrylation composition may include, but are not limited to, coated surfaces where bioremediation and degradation are favorable to the environment, customized conformal and engineered forms for controlled implantable drug delivery devices, films having customized properties for a physiological application, as a binder in animal feeds and environmental processing of biomass such as pelletizing, photoresist technology for neuro implants such as a biodegradable printed wiring board for temporary use followed by biodegradation/bioresorption without surgical removal, conformal skin-wound closure, bioadhesives with elastomeric behavior, crop application of pesticides, architectural weathering coatings to simulate aging, biocide delivery, and any other radiation-curable application where biodegradation or bio-remedial features are attractive or beneficial, such as, for example, self-cleaning erodible coatings to provide environmentally friendly barrier coatings for applications, such as, for example, anti-corrosion, antimicrobial, antifungal, water-resistant, antifouling, or anti-graffiti.

In exemplary embodiments, the resulting compositions may be incorporated into a process of making an article of manufacture, such as, for example, a microparticle or a nanoparticle. The radiation-curable composition may form either solvent-based or emulsion-based UV-cured microspheres as microcarriers. In exemplary embodiments, the microspheres are suspended in a medium without touching each other and are cured to form cured microspheres without contact surface defects.

In one such embodiment, a glass-quartz cylinder includes a port at the bottom fitted to receive a membrane-stopper. The glass-quartz cylinder is filled with stabilized water, and UV curing lamps are configured in parallel around the glass-quartz cylinder. The uncured or unexposed (meth)acrylated prepolymer is injected into the glass-quartz cylinder by way of the membrane port from below. The (meth) acrylated prepolymer is delivered as individual spherical drops to the glass-quartz cylinder. Once a drop leaves the needle upon attaining sufficient volume, the sphere floats upward, because the density of the (meth)acrylated prepolymer is less than the density of water. UV-irradiation of the glass cylinder, as the sphere ascends the height of the glass-quartz cylinder, crosslinks the (meth)acrylate prepolymer to a solid and tack-free microsphere by the time it reaches the surface of the water in the glass-quartz cylinder, thereby providing a UV-cured elastomeric microsphere or microcarrier. In exemplary embodiments, the process includes a feed-and-bleed system for continuous production of such microspheres.

In some embodiments, a coating composition includes the (meth)acrylated prepolymer as a vehicle carrier that is loaded with nutritional materials. Such a coating composition may be affixed to surfaces and plastic films as a coating.

The (meth)acrylated prepolymer may be incorporated into almost any bio-based engineering system with bioremediation or biodegradation, including agricultural and pest control. In some embodiments, the (meth)acrylated prepolymer is further formulated in radiation-curable coatings and processes to act as a degradable linage material with multiple lines and spaces, such as, for example, circuitry. For instance, a radiation-curable photoresist and mask may be used to develop 100% biodegradable "build-up boards" for high density interconnect (HDI) circuit technologies. In some embodiments, the (meth)acrylated prepolymer is developed to allow biodegradable circuitry for temporary neural implantation.

EXAMPLES

The invention is further described in the context of the following examples, which are presented by way of illustration, not of limitation.

Example 1

PGS was synthesized as disclosed in U.S. Pat. No. 9,359,472. Then, 15 g of PGS, 15 mL of acrylic acid, 0.6 g of butylated hydroxytoluene (BHT) as an inhibitor, and 3 mL of water were charged to a reactor fitted with a magnetic stir bar and a distillation head. The reaction mixture was then heated to and maintained at 120° C. for 16 hours then cooled and dissolved into 100 mL of tetrahydrofuran (THF). The solution was run through a basic alumina column to remove the inhibitor. The polymer solution was precipitated into 600 mL of water three times, decanted, and dried under vacuum overnight. The resulting PGSA polymer was a viscous liquid. Referring to the FIGURE, Fourier-transform infrared (FT-IR) spectroscopy confirmed the presence of acrylate groups by a peak at 810 cm' of the PGSA spectrum that is not present in the spectrum of PGS.

Example 2

Sebacic acid (100 g/0.494 mol), glycerol (44.54 g/0.494 mol), acrylic acid (7.12 g/0.098 mol), 0.45 g of BHT as an inhibitor, and water (11.5 g/0.643 mol) were charged to a reactor. The mixture was then melted by heating under a blanket of nitrogen. Once the mixture was melted, the reactor temperature was set to 120° C. for 24 hours. The product including the PGSA polymer was then cooled and dissolved into THF. The solution was run through a basic alumina column to remove the inhibitor. The polymer solution was precipitated into water three times, decanted, and dried under vacuum overnight. The resulting polymer was a viscous liquid. The FT-IR results confirmed the presence of an acrylate at the 810 $cm^{-1}$ band for the PGSA polymer not present for the control PGS polymer. Gas permeation chromatography (GPC): Mw=4600; Mw/Mn=2.3.

All above-mentioned references are hereby incorporated by reference herein.

While the invention has been described with reference to one or more exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In addition, all numerical values identified in the detailed description shall be interpreted as though the precise and approximate values are both expressly identified.

What is claimed is:

1. A water-mediated process of preparing a polymeric (meth)acrylation composition, comprising the steps of:

providing a stabilized aqueous solution comprising at least one (meth)acrylation component and a polyol monomer in a vessel under an inert atmosphere;

adding a diacid monomer to the vessel under the inert atmosphere; and heating and removing water from the vessel under the inert atmosphere to produce the polymeric (meth)acrylation composition;

wherein the polymeric (meth)acrylation composition comprises a (meth)acrylation polyester copolymer of the diacid monomer and the polyol monomer with the at least one (meth)acrylation component conjugated to the (meth)acrylation polyester copolymer.

2. The process of claim 1, wherein the stabilized aqueous solution aids in preventing propagation and initiation of a free radical polymerization of the (meth)acrylate during the combining, the adding; and the heating and removing.

3. The process of claim 1 further comprising degassing an aqueous solution to form the stabilized aqueous solution.

4. The process of claim 1 further comprising adding a free radical stabilizer, a polymerization inhibitor, or a combination thereof to an aqueous solution to form the stabilized aqueous solution.

5. The process of claim 1, wherein the at least one (meth)acrylation component comprises a (meth)acrylate.

6. The process of claim 1, wherein the at least one (meth)acrylation component comprises a photoinitiator.

7. The process of claim 6, wherein the photoinitiator is selected from the group consisting of ethyl eosin, eosin Y, fluorescein, 2,2-dimethoxy, 2-phenylacetophenone, 2-methoxy, 2-phenylacetophenone, camphorquinone, rose bengal, methylene blue, erythrosin, phloxime, thionine, riboflavin, and methylene green.

8. The process of claim 6, wherein the photoinitiator comprises riboflavin.

9. The process of claim 1, wherein the at least one (meth)acrylation component comprises a co-initiator.

10. The process of claim 9, wherein the co-initiator is selected from the group consisting of triethanolamine, triethylamine, ethanolamine, N-methyl diethanolamine, N,N-dimethyl benzylamine, N-benzyl ethanolamine, N-isopropyl benzylamine, tetramethyl ethylenediamine, potassium persulfate, tetramethyl ethylenediamine, lysine, ornithine, histidine, and arginine.

11. The process of claim 9, wherein the co-initiator comprises arginine.

12. The process of claim 1, wherein the heating and removing water from the vessel comprises refluxing the at least one (meth)acrylation component, the polyol monomer, the aqueous solution, and the diacid monomer.

13. The process of claim 1, wherein the polyol monomer comprises glycerol.

14. The process of claim 1, wherein the diacid monomer comprises sebacic acid.

15. The process of claim 1, wherein the polymeric (meth)acrylation composition is free of mineral acid and free of cytotoxic solvents, catalysts, and scavengers.

* * * * *